United States Patent
Stanich et al.

(10) Patent No.: US 11,570,332 B2
(45) Date of Patent: Jan. 31, 2023

(54) COLOR SPACE INK MODEL GENERATION MECHANISM

(71) Applicants: Mikel Stanich, Boulder, CO (US); Pallavi Premkumar, Boulder, CO (US); Nikita Gurudath, Boulder, CO (US)

(72) Inventors: Mikel Stanich, Boulder, CO (US); Pallavi Premkumar, Boulder, CO (US); Nikita Gurudath, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/184,821

(22) Filed: Feb. 25, 2021

(65) Prior Publication Data
US 2022/0272230 A1 Aug. 25, 2022

(51) Int. Cl.
H04N 1/60 (2006.01)
H04N 1/00 (2006.01)

(52) U.S. Cl.
CPC ............. H04N 1/60 (2013.01); H04N 1/0097 (2013.01)

(58) Field of Classification Search
CPC .................................. H04N 1/60; H04N 1/0097
See application file for complete search history.

(56) References Cited

U.S. PATENT DOCUMENTS

| | | | |
|---|---|---|---|
| 6,484,631 B2 | 11/2002 | Degani et al. | |
| 7,423,778 B2 | 9/2008 | Hersch et al. | |
| 7,773,256 B2* | 8/2010 | Edge | H04N 1/6016 358/1.9 |
| 8,100,057 B2 | 1/2012 | Hartmann et al. | |
| 8,180,230 B2* | 5/2012 | Klassen | G03G 15/556 399/27 |
| 8,322,811 B2 | 12/2012 | Chandu et al. | |
| 8,576,450 B2 | 11/2013 | Shepherd et al. | |
| 8,705,121 B2 | 4/2014 | Hattenberger | |
| 8,734,034 B2* | 5/2014 | Morovic | H04N 1/00068 400/62 |
| 8,923,713 B2 | 12/2014 | Terao et al. | |
| 9,019,561 B1 | 4/2015 | Sanchez et al. | |
| 9,056,485 B2 | 6/2015 | Szafraniec | |

(Continued)

FOREIGN PATENT DOCUMENTS

CN 107945097 4/2018
DE 102013113281 7/2014

(Continued)

OTHER PUBLICATIONS

Notice of Allowance for U.S. Appl. No. 17/165,238, 10 pages, dated Jun. 7, 2022.

(Continued)

Primary Examiner — Ted W Barnes
(74) Attorney, Agent, or Firm — Jaffery Watson Mendonsa & Hamilton LLP

(57) ABSTRACT

A printing system is disclosed. The printing system includes at least one physical memory device to store ink model estimation logic and one or more processors coupled with the at least one physical memory device to execute the ink model estimation logic to generate color space ink model parameter data for a print system based on an ink deposition data and color space measurement data for one of a plurality of inks for the print system.

17 Claims, 12 Drawing Sheets

(56) References Cited

U.S. PATENT DOCUMENTS

| | | |
|---|---|---|
| 9,096,056 B2 | 8/2015 | Zhou et al. |
| 9,102,157 B2 | 8/2015 | Prothon et al. |
| 9,132,629 B2 | 9/2015 | Ward et al. |
| 9,347,874 B2* | 5/2016 | Keydar ................ G01N 21/255 |
| 9,427,963 B2 | 8/2016 | Clippingdale et al. |
| 9,565,339 B2* | 2/2017 | Noffke ................ H04N 1/6027 |
| 9,621,762 B2* | 4/2017 | Chandu ................ H04N 1/407 |
| 9,643,408 B1 | 5/2017 | Schweid |
| 9,656,463 B1 | 5/2017 | Ernst et al. |
| 9,661,154 B1* | 5/2017 | Stanich .............. H04N 1/00068 |
| 9,785,873 B2 | 10/2017 | Stanich et al. |
| 10,129,436 B2 | 11/2018 | Kimura |
| 10,214,038 B2 | 2/2019 | Klinger et al. |
| 10,237,452 B2 | 3/2019 | Rius Rossell et al. |
| 10,338,496 B2 | 7/2019 | Able et al. |
| 10,549,523 B2* | 2/2020 | Stanich ................ B41F 33/0045 |
| 11,182,113 B2 | 11/2021 | Stanich et al. |
| 2003/0179410 A1 | 9/2003 | Velde |
| 2007/0091138 A1* | 4/2007 | Hersch ................ B41F 33/0045 347/19 |
| 2008/0055355 A1* | 3/2008 | Hersch ................ H04N 1/6097 347/19 |
| 2008/0111842 A1* | 5/2008 | Hall ..................... B41J 2/17566 347/7 |
| 2010/0067936 A1 | 3/2010 | Kitajima et al. |
| 2010/0150582 A1* | 6/2010 | Klassen .............. G03G 15/553 399/27 |
| 2013/0101328 A1* | 4/2013 | Morovic ............ H04N 1/00005 400/76 |
| 2013/0106936 A1* | 5/2013 | Shin ...................... H04N 1/603 347/15 |
| 2013/0176600 A1* | 7/2013 | Chandu ................ H04N 1/405 358/3.06 |
| 2013/0222461 A1 | 8/2013 | Kaszynski |
| 2014/0210898 A1* | 7/2014 | Mantell ................ B41J 2/17566 347/19 |
| 2017/0080732 A1* | 3/2017 | Kasahara ............. B41J 2/0456 |
| 2017/0118360 A1 | 4/2017 | Arner |
| 2017/0201654 A1* | 7/2017 | Rius Rossell ........ H04N 1/6033 |
| 2017/0259560 A1 | 9/2017 | Sreenivasan et al. |
| 2018/0234582 A1 | 8/2018 | Stanich et al. |
| 2019/0050971 A1* | 2/2019 | Fukuda ................ H04N 1/407 |
| 2019/0238723 A1* | 8/2019 | Morovic ................ H04N 1/60 |
| 2019/0268482 A1 | 8/2019 | Stanich et al. |
| 2019/0270304 A1* | 9/2019 | Stanich .............. H04N 1/00034 |
| 2019/0351674 A1 | 11/2019 | Stritzel |
| 2020/0108621 A1 | 4/2020 | Ferreri |
| 2020/0274991 A1* | 8/2020 | Stanich ................ H04N 1/6038 |
| 2020/0320357 A1* | 10/2020 | Morovic ............ G06K 15/1822 |
| 2020/0374419 A1* | 11/2020 | Liefferink ............ H04N 1/6005 |

FOREIGN PATENT DOCUMENTS

| | | | |
|---|---|---|---|
| EP | 0454448 | 10/1991 | |
| EP | 2313272 B1 | 2/2010 | |
| EP | 3534600 A1 * | 9/2019 | .......... B41F 33/0009 |
| JP | 2015054934 | 3/2015 | |
| JP | 2018-1751 | 1/2018 | |
| JP | 2018174143 | 11/2018 | |
| JP | 2020-37238 | 3/2020 | |
| WO | 2018022077 A1 | 2/2018 | |

OTHER PUBLICATIONS

Bugnon et al., "Calibrating Ink Spreading Curves by Optimal Selection of Tiles from Printed Color Images", vol. 21, Issue 1, paper 013024 (2012), pp. 1-14.

Park, J., Kim, B., Kim, S. Y., & Hwang, J. (2014). Prediction of drop-on-demand (DOD) pattern size in pulse voltage-applied electrohydrodynamic (EHD) jet printing of Ag colloid ink. Applied Physics A, 117(4), 2225-2234.

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/9110910. See highlighted and underlined sections.

U.S. Appl. No. 17/165,291 entitled, "Ink Model Generation Mechanism", filed Feb. 2, 2021, 46 pages.

U.S. Appl. No. 17/165,238 entitled, "Ink Model Generation Mechanism", filed Feb. 2, 2021, 47 pages.

European Search Report for EP22150361.8, dated Jul. 8, 2022, 11 pages.

* cited by examiner

COLOR SPACE INK MODEL GENERATION MECHANISM

FIELD OF THE INVENTION

The invention relates to the field of image reproduction.

BACKGROUND

Determining ink model parameter estimates typically involves applying an ink model to generate the parameter estimates based on OD vs ink deposition parameters. However, the application of conventional ink models to generate the parameters has limitations.

Accordingly, a mechanism to generate and implement color space ink model parameter data estimates is desired.

SUMMARY

In one embodiment, a printing system is disclosed. The printing system includes at least one physical memory device to store ink model estimation logic and one or more processors coupled with at least one physical memory device to execute the ink model estimation logic to generate color space ink model parameter data for a print system based on an ink deposition data and color space measurement data for one of a plurality of inks for the print system.

BRIEF DESCRIPTION OF THE DRAWINGS

A better understanding of the present invention can be obtained from the following detailed description in conjunction with the following drawings, in which.

DETAILED DESCRIPTION

A mechanism for generating and applying color space ink model parameter data estimates is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
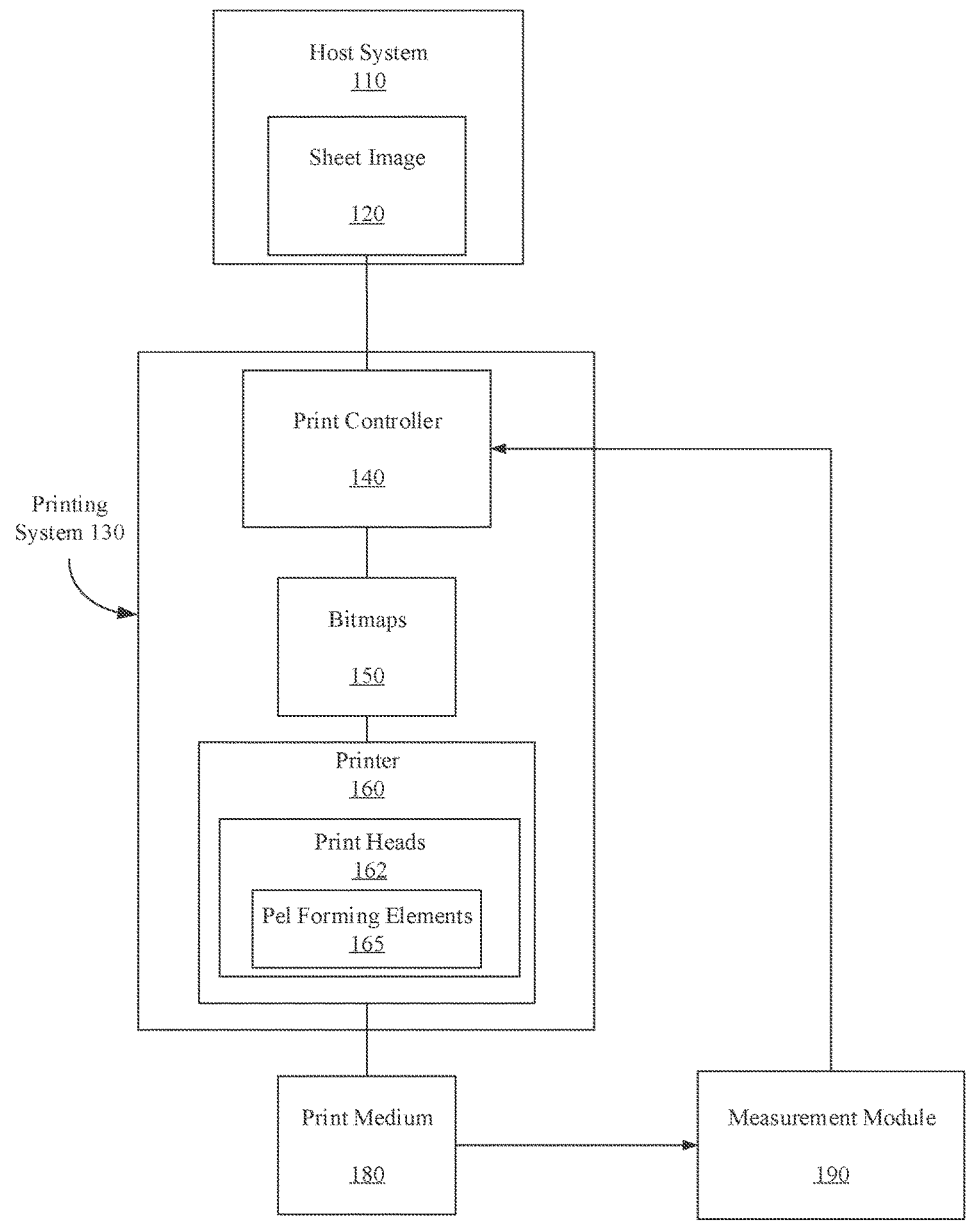
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of several gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of ink model and drop size systems to obtain measurements of the printed medium 180. The measured results are communicated to print controller 140 to be used to generate ink model parameter data, as well as generate drop size data. The measurement system may be a stand-alone process or be integrated into the printing system 130.

According to one embodiment, measurement module 190 may be a sensor to take measurements of printed images on print medium 180. Measurement module 190 may generate and transmit print image measurement data. Print image measurement data (e.g., color space measurement data) may be color response data for the parameters (e.g., coordinates) of a specific color space (e.g., CIELAB, CIEXYZ, etc.) corresponding to a printed image that is either raw or processed. In one embodiment, measurement module 190 may comprise one or more sensors that each or in total take measurements for printed markings produced for some or all pel forming elements 165.

In another embodiment, measurement module 190 may be a camera system, in-line scanner, or spectrophotometer, where the preferred embodiment is a spectrophotometer. In a further embodiment, print image measurement data may include a map information to correlate portions (e.g., a pel or plurality of pels) of the print image data to the corresponding pel forming elements 165 that produced the portions of the printed images. In a further embodiment, measurement module 190 includes capability to measure ink volumes processed during printing, generate ink volume data and transmit ink volume data to allow one to determine the drop sizes ejected by the pel forming elements 165.

Figure 2A:
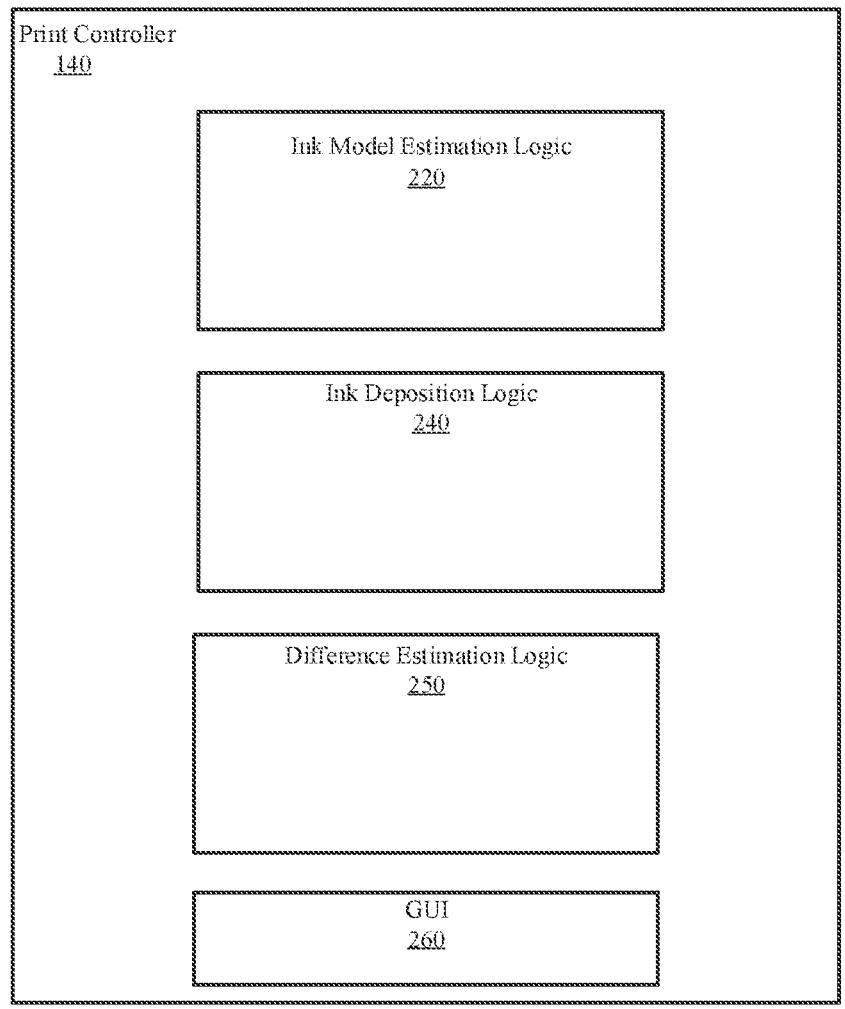
FIGS. 2A&2B illustrate block diagrams of embodiments of a print controller.
Figure 2B:
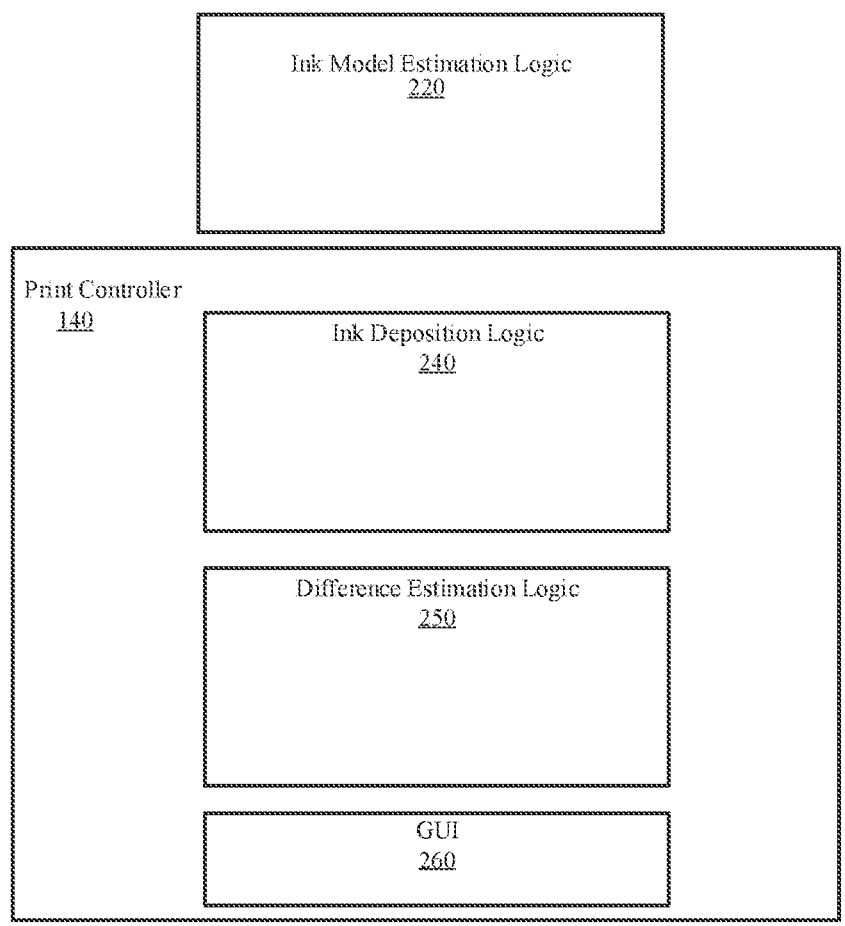

FIGS. 2A&2B illustrate embodiments implementing print controller 140. FIG. 2A illustrates a print controller 140 (e.g., DFE or digital front end), in its generalized form, including ink model estimation logic 220, ink deposition logic 240 and difference estimation logic 250. FIG. 2B illustrates an embodiment in which print controller 140 includes ink deposition logic 240 and difference estimation logic 250, while ink model estimation logic 220 is coupled externally. In either embodiment, the separate components may represent hardware used to implement the print controller 140. Alternatively, or additionally, the separate components may represent logical blocks implemented by executing software instructions in a processor of the printer controller 140.

Figure 2C:
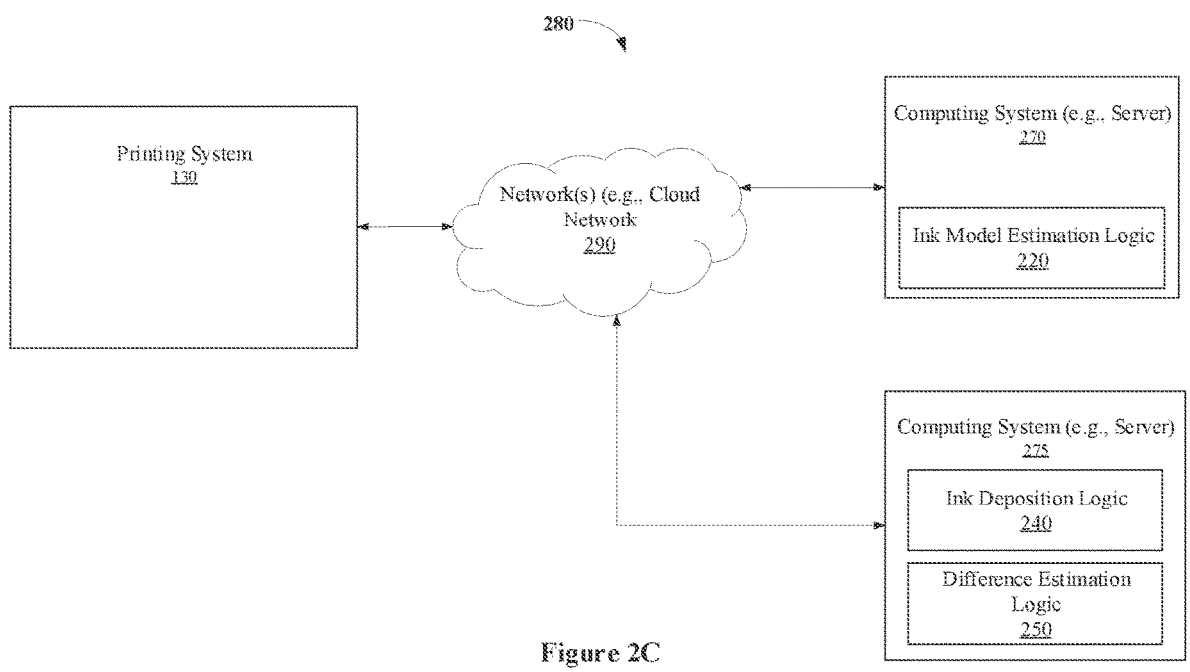
FIG. 2C illustrates another embodiment of a print controller implemented in a network.

Although shown as a component outside of print controller 140, other embodiments may feature one or more of ink model estimation logic 220, ink deposition logic 240 and difference estimation logic 250 included within independent devices, or combination of devices, communicably coupled to print controller 140. For instance, FIG. 2C illustrates one embodiment of ink model estimation logic 220, ink deposition logic 240 and difference estimation logic 250 implemented in a network 280. As shown in FIG. 2C, ink model estimation logic 220 is included in a computing system 270, while ink deposition logic 240 and difference estimation logic 250 are included within a computing system 275. In one embodiment, each component transmits data to printing system 130 via a cloud network 290.

According to one embodiment, ink model estimation logic 220 generates color space ink model parameter data for a print system based on an ink deposition data and device independent color space measurement data for each ink color (e.g., CMYK) implemented in printing system 130. In such embodiments, the color space ink model (e.g., a set of parametric equations that include the color space parameters) represents a relationship between parameter values in a color space and ink deposition. In further embodiments, the ink deposition data represents a relationship between ink deposition and a print system input control (e.g., digital count, gray level, percent dot, etc.), and the color space measurement data represents a relationship between a color space parameters (e.g., L*, a* or b* for CIELAB color space) and the print system input control.

As used herein, ink deposition is defined as an average amount of ink deposited per printed device pel, where a pel is a picture element of the printer 160 (e.g., the printing device). Since the physical spacing of pels of printer 160 is known, the pels of printer 160 may be readily converted to area. The print system input control comprises a digital count that is a gray level representing the pels in bitmap 150. In one embodiment, the amount of ink deposition changes as a function of print system input control (e.g., digital count, gray level, percent dot, etc.). In such an embodiment, the digital count for pels in bitmap 150 range from 0-255 for a typical 8 bit system. Additionally, the digital count is a control parameter of an output pel. In yet a further embodiment, the ink deposition data may be represented as an ink deposition curve, which defines the ink deposition over the range of all possible gray levels (e.g., 0-255). In such an embodiment, ink deposition may be computed on an average basis to eliminate local variations due to halftoning using a set of discrete drop sizes.

Figure 3:
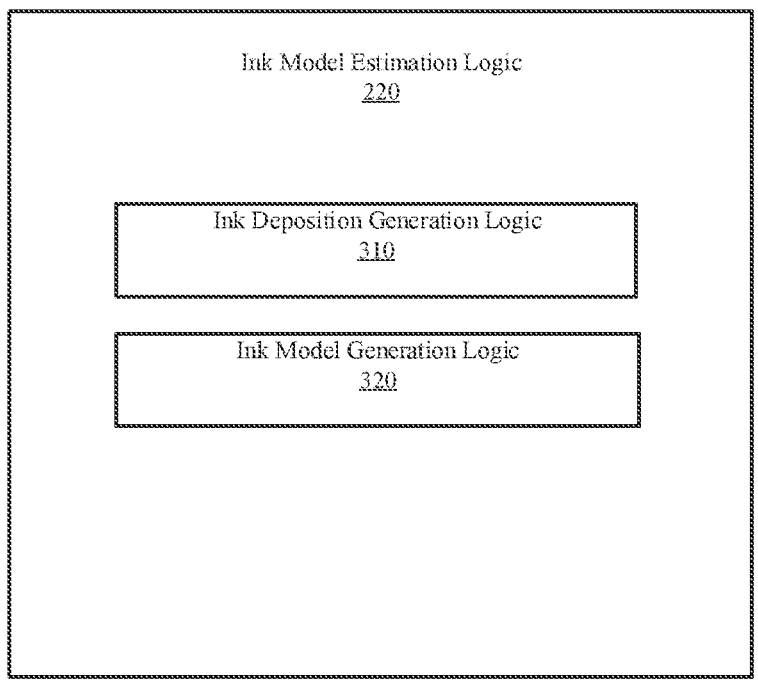
FIG. 3 illustrates one embodiment of ink model estimation logic.

FIG. 3 illustrates one embodiment of ink model logic 220. As shown in FIG. 3, ink model estimation logic 220 includes ink deposition generation logic 310 and ink model generation logic 320. According to one embodiment, ink deposition generation logic 310 generates the ink deposition data that is used to generate the color space ink model parameter data. In such an embodiment, ink deposition generation logic 310 generates the ink deposition data based on received drop size data and halftone drop fractions (or drop counts) resulting from the printing of test print jobs (e.g., printed at printing system 130 and measured at measurement module 190).

Ink drop sizes may be determined by analyzing an amount of ink used as measured by 190 and counts of ink drops of each size, where counts are obtained by counting the different drops commanded to drive the pel forming elements 165. Regression is employed to determine drop sizes by relating the amount of ink used and the respective drop counts for the same jobs being printed.

Ink model generation logic 320 generates color space ink model parameter data based on the generated ink deposition data and received color space measurement data. In one embodiment, the color space measurement data comprises CIELAB color space (or CIF L*a*b*) values. However in other embodiments, other color space values (e.g., CIEXYZ) may be implemented. By generating a color space ink model that is based on the parameters of the color space (e.g., CIELAB), the irk deposition CMYK) for the input color space value may be efficiently determined as shown below.

In one embodiment, color space ink model parameter data comprises parameter estimates that are generated by applying an ink model, such as a Weibull ink model regression, to create a relationship between CIELAB color space parameters and ink deposition data. Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables.

In one embodiment, the Weibull CDF is modified to describe a quantity of ink deposition that is required to achieve specific L*, a*, b* (or (Lab)) values. This modified Weibull CDF will be described as simply "Weibull CDF". The forward Weibull CDF relates ink deposition to Lab, while the inverse Weibull CDF relates Lab to ink deposition.

In one embodiment, the Weibull CDF models L* vs ink deposition as:

$$L^* = \left(p(3) * \left(1 - e^{-\left(\frac{x}{p(1)}\right)^{p(2)}}\right)\right) + p(4)$$

Meanwhile a fourth order polynomial is implemented to model a* or b* vs ink deposition, such that:

$$a^* = (p(5)*x^4) + (p(6)*x^3) + (p(7)*x^2) + (p(8)*x) + p(9); \text{ and}$$

$$b^* = (p(10)*x^4) + (p(11)*x^3) + (p(12)*x^2) + (p(13)*x) + p(14), \text{ where}$$

L* and a* are CIE Lab L* and a* respectively; x is the ink deposition (e.g., mg per square inch); p(1) is the Weibull scale parameter, p(2) is a Weibull slope parameter; p(3) is a solid area/infinite ink deposition L* parameter; p(4) is a Paper L*; p(5) is a fourth order parameter for a*; p(6) is a third parameter for a*; p(7) is a second parameter for a*; p(8) is a linear parameter for a*; p(9) is a constant parameter for a*; b* is CIE Lab b*; x is the ink deposition (e.g., mg per square inch); p(10) is a fourth order parameter for b*; p(11) is a third parameter for b*; p(12) is a second parameter for b*; p(13) is a linear parameter for b*; and p(14) is a constant parameter for b*. For generating the L* Weibull ink model, an exponential regression is performed, such that $$L^* = W(i) = M(ID^{-1}(i)), \text{ where}$$

ID(g) is an uncalibrated ink deposition a function of gray level g; M(g) is a measured L* as a function of gray level g; and W is the ink model W(i) as a function of ink deposition i, which relates L* to ink deposition. As referred to herein, a gray level is synonymous with a digital count. The inverse relationship can be used to determine the ink deposition from the L* values, as represented as:

$$W^{-1}(L^*) = ID(M^{-1}(L^*)).$$

Figure 4A:
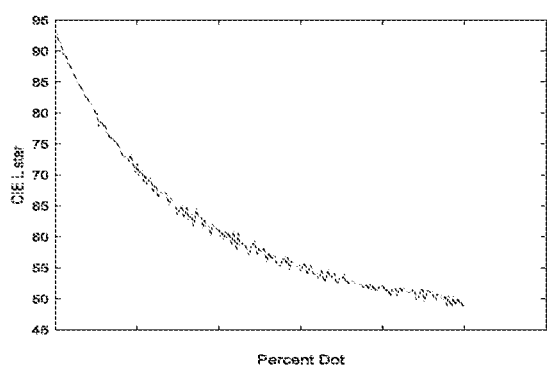
FIGS. 4A-4C illustrate embodiment of graphs showing ink models and associated parameters.
Figure 4A:
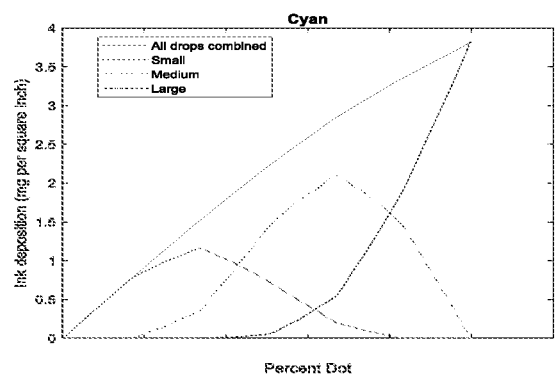
Figure 4A:
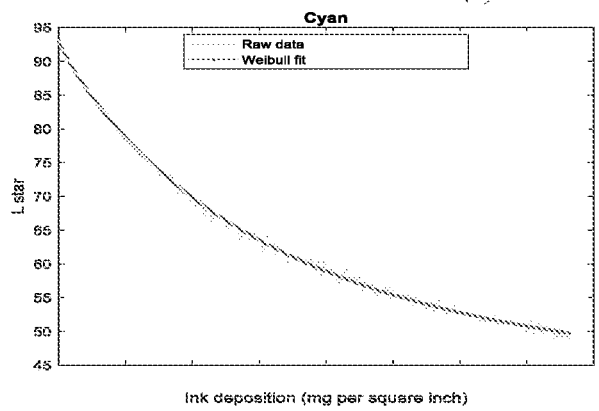

FIG. 4A illustrates one embodiment of graphs showing the L* Weibull ink model, and parameters L* and ink deposition.

For generating the a* Weibull ink model, a fourth order regression model used to fit the ink model W to a*, such that:

$$a^* = W(i) = M(ID^{-1}(i)), \text{ where}$$

M(g) is the measured a* as a function of gray level g. The inverse relationship can be used to determine the ink deposition from the a* values, as represented as:

$$W^{-1}(a^*) = ID(M^{-1}(a^*))$$

Figure 4B:
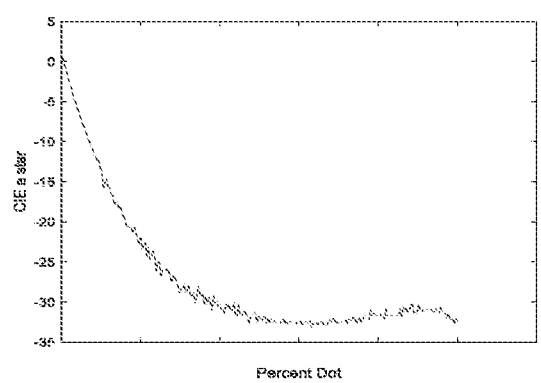
Figure 4B:
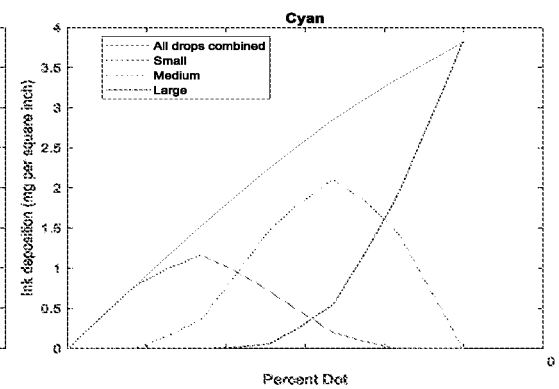
Figure 4B:
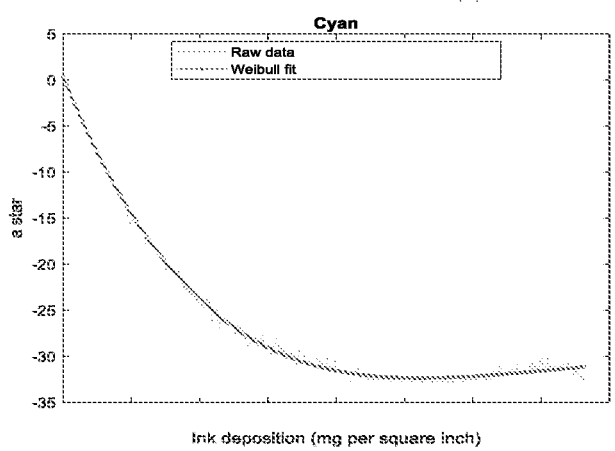

FIG. 4B illustrates one embodiment of graphs showing the a* Weibull ink model, and parameters a* and ink deposition.

For generating the b* Weibull ink model, a fourth order regression model used to fit the ink model W to b*, such that:

$$b^* = W(i) = M(ID^{-1}(i)), \text{ where}$$

M(g) is the measured b* as a function of gray level g. The inverse relationship can be used to determine the ink deposition from the b* values, as represented as:

$$W^{-1}(b^*) = ID(M^{-1}(b^*))$$

Figure 4C:
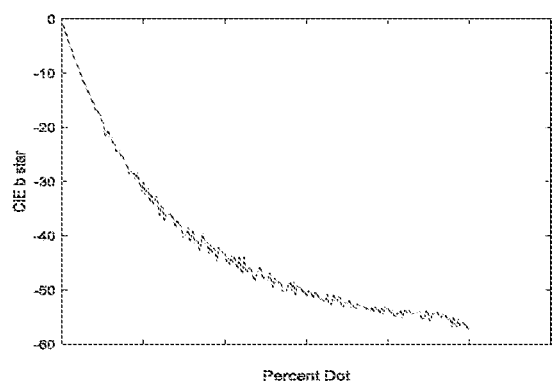
Figure 4C:
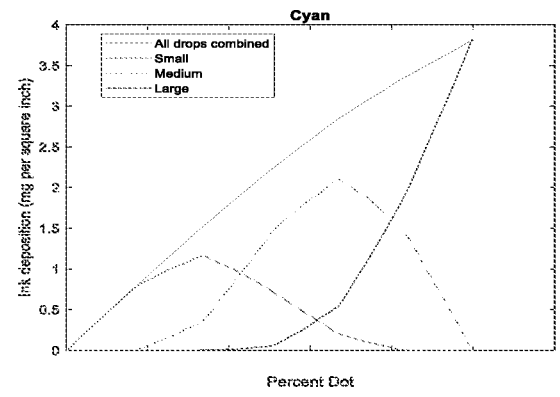
Figure 4C:
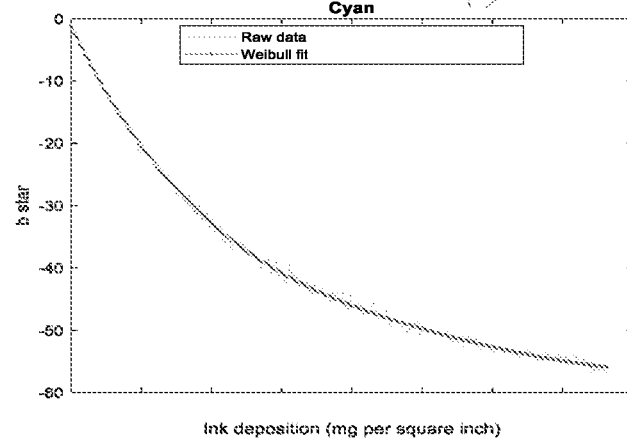

FIG. 4C illustrates one embodiment of graphs showing the b* Weibull ink model, and parameters b* and ink deposition.

Figure 5:
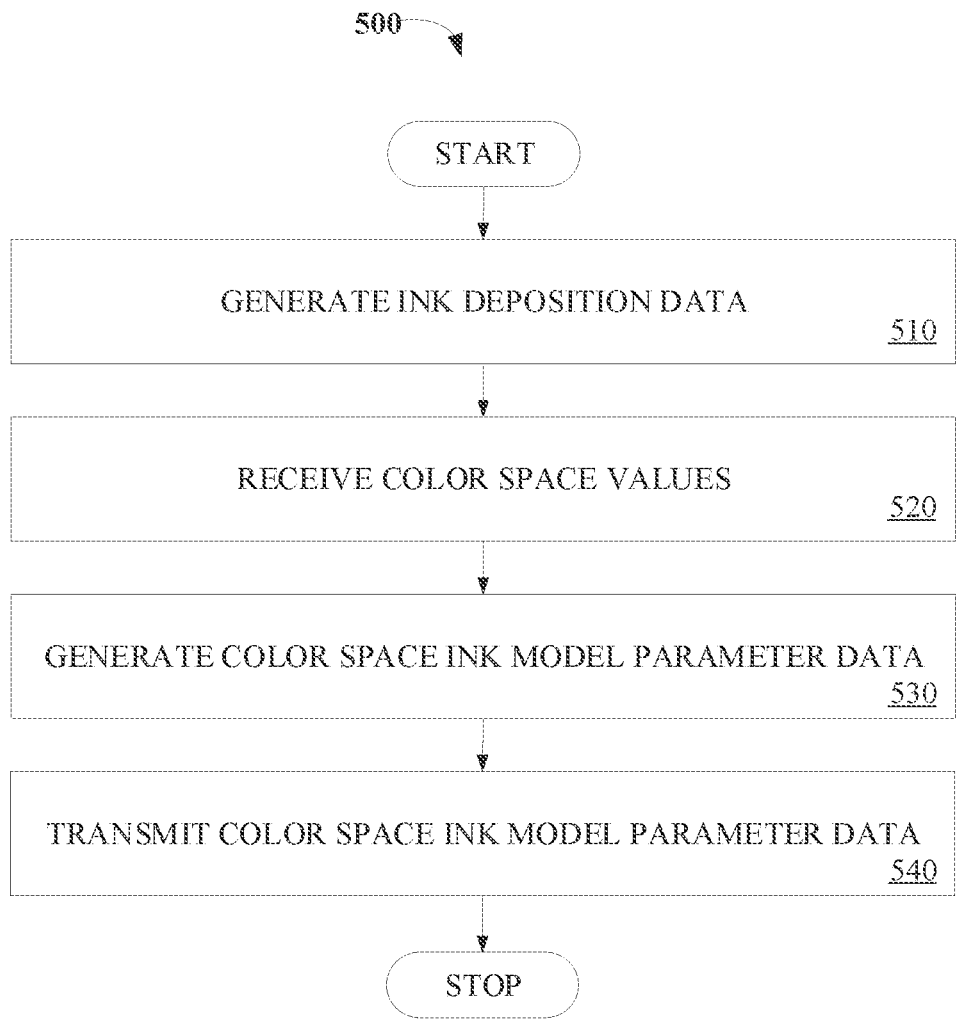
FIG. 5 is a flow diagram illustrating one embodiment of an ink model computation process.

FIG. 5 is a flow diagram illustrating one embodiment of a process 500 for performing an ink model computation. Process 500 may be performed by processing logic that may include hardware (e.g., circuitry, dedicated logic, programmable logic, microcode, etc.), software such as instructions run on a processing device, or a combination thereof. In one embodiment, process 500 is performed by ink model estimation logic 220.

According to one embodiment, process 500 begins at processing block 510, where ink deposition data is generated or received. As discussed above, the ink deposition data is generated based on received drop size data and drop fraction data. At processing block 520, input color space values (e.g., CIELAB) are received. At processing block 530, color space ink model parameter data is generated by applying the L*, a* and b* models to the received color space values and ink deposition data. At processing block 540, the color space ink model parameter data is transmitted.

Figure 6:
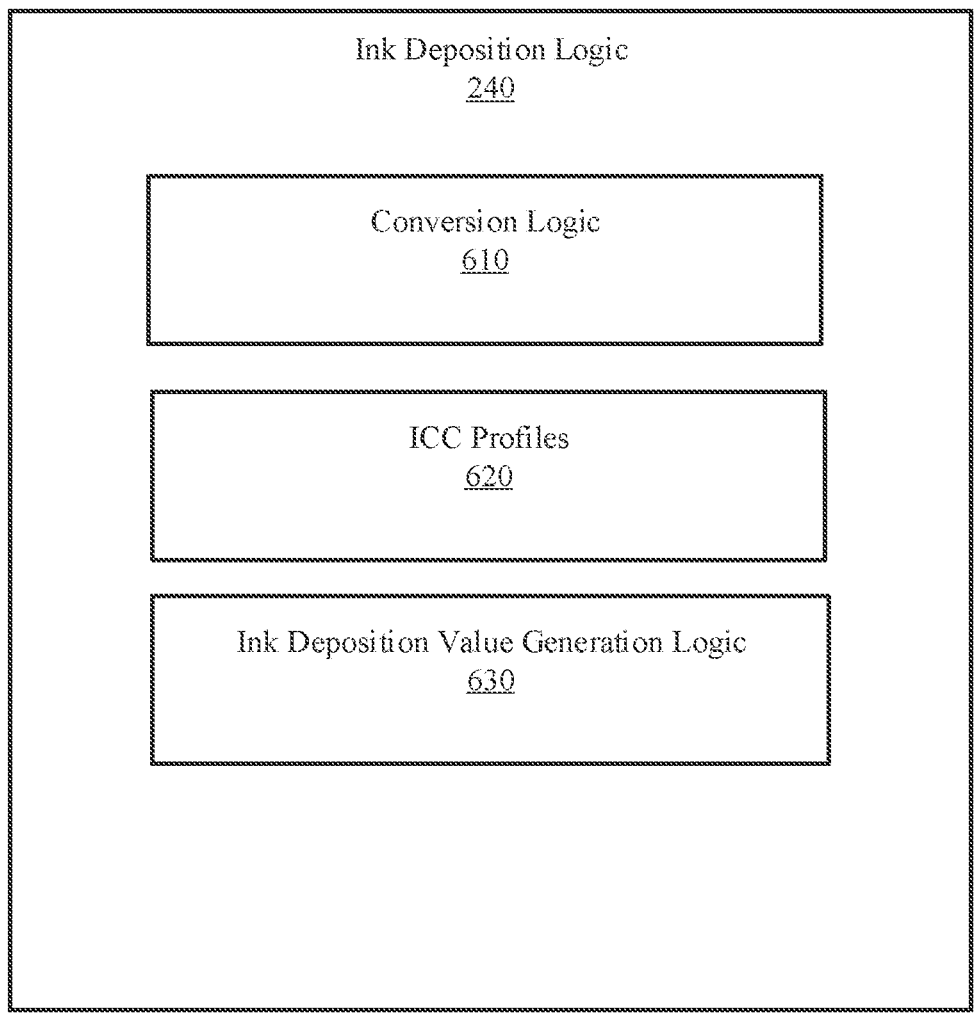
FIG. 6 illustrates one embodiment of ink deposition logic.

Referring to FIG. 2, ink deposition logic 240 is implemented to generate ink deposition data for each of a plurality of input colors (e.g., CMYK) implemented at printing system 130. In one embodiment, ink deposition logic 240 receives the color space ink model parameter data from ink model estimation logic 220 and applies the color space ink model parameter data to each input color to generate ink deposition data for each of the input colors. FIG. 6 illustrates one embodiment of ink deposition logic 240, including conversion logic 610, one or more International Color Consortium (ICC) profiles 620, and ink deposition value generation logic 630.

Conversion logic 610 is implemented to perform color space conversions. According to one embodiment, conversion logic 610 converts between a profile connection space (PCS) (e.g., CIELAB) and a device color space (e.g., CMYK). In such an embodiment, conversion logic 610 uses an ICC profile 620 to perform a mapping between CIELAB and CMYK colors. ICC profiles describe color attributes of a particular device or viewing requirement by defining mappings between a device color space and device independent color space.

In one embodiment conversion logic 610 receives input color space values (e.g., CIELAB color values) and uses an ICC profile 620 to convert the CIELAB color value to a CMYK color value (e.g., PCS to device space conversion). In a further embodiment, conversion logic 610 performs a second conversion to convert each color component of the CMYK color value to a CIELAB color value (e.g., device space to PCS conversion) using ICC profiles 620. In such an embodiment, each CMYK primary color component comprises a digital count (DC_X), which when converted results in separate L*_X, a*_X and b*_X values associated with each primary color component. Thus, the second conversion results in L*_X, a*_X and b*_X values being generated for each of the C, M, Y and K digital count values.

Ink deposition value generation logic 630 receives the L*_X, a*_X and b*_X values and generates ink deposition data. In one embodiment, ink deposition value generation logic 630 generates the ink deposition data by applying the inverse L*, a* and b* ink models to the L*_X, a*_X and b*_X values and the previously received color space values. As a result, ink deposition values (e.g., ID_L*_X, ID_a*_X, and ID_b*_X) are generated for each original primary color component.

In a further embodiment, ink deposition value generation logic 630 subsequently combines (e.g., using averaging) the ink deposition values associated with each primary color to generate an ink deposition data value (ID_X) corresponding to each of the primary color components. In such an embodiment, ID_L*_X, ID_a*_X, and ID_b*_X for C is combined to generate ID_C data; ID_L*_X, ID_a*_X, and ID_b*_X for M is combined to generate ID_M data; ID_L*_X, ID_a*_X, and ID_b*_X for Y is combined to generate ID_Y data; and ID_L*_X, ID_a*_X, and ID_b*_X for K is combined to generate ID_K data.

In some cases, since the inverse may not be single values, the correct single inverse ink deposition values must be determined. One method that can be employed uses the ink deposition derived from the L* vs ink deposition. The inverse L* relationship produces a single value which can then be used to resolve the proper ink deposition values to use from the inverse a* and inverse b* determinations. Once generated, the ink deposition data (ID_C, ID_M, ID_Y and ID_K) is transmitted. In one embodiment, the ink deposition data is transmitted with the original input CIELAB color values and converted CMYK color values. This provides the CMYK ink deposition values for any CIELAB color.

Figure 7:
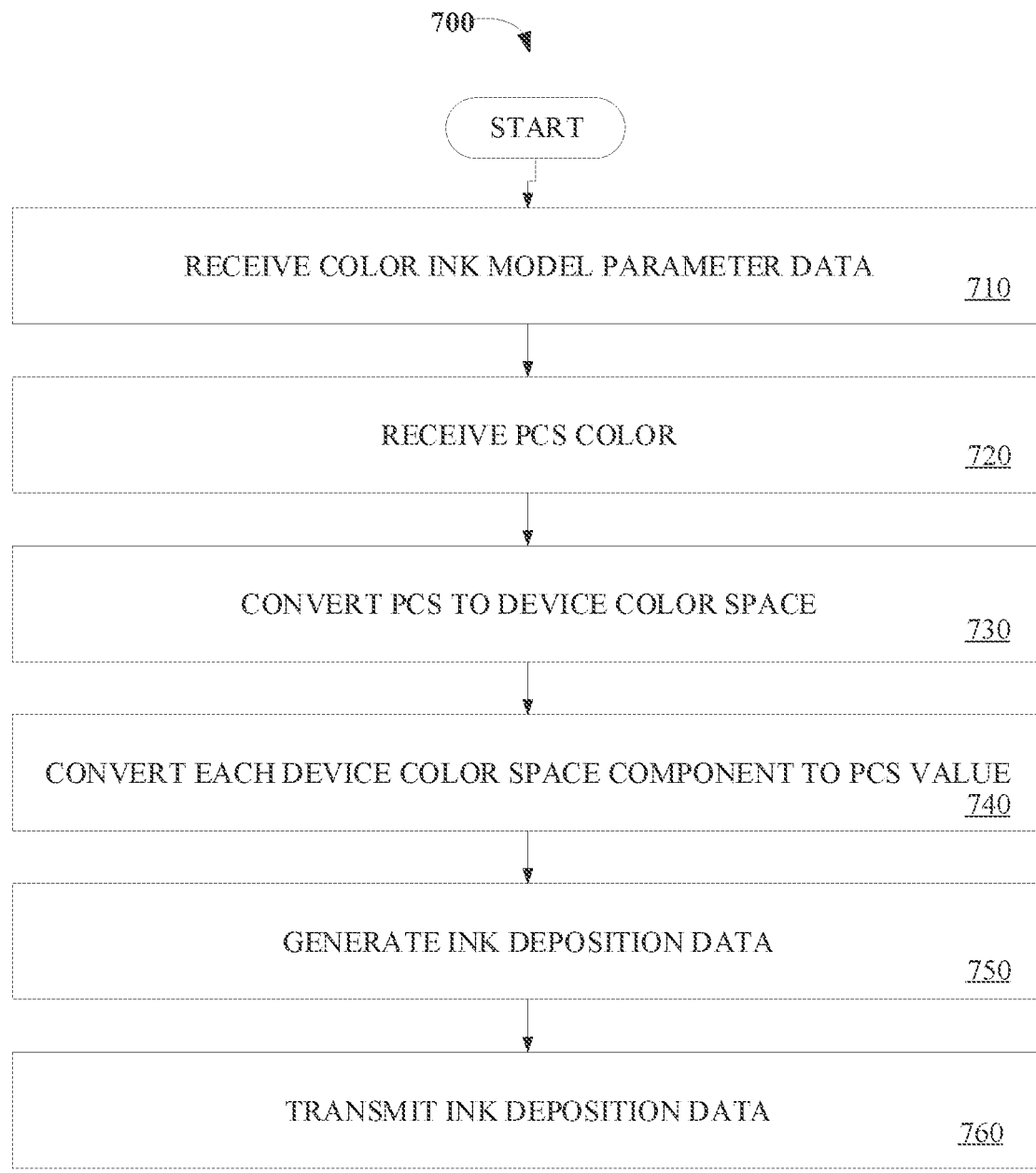
FIG. 7 is a flow diagram illustrating one embodiment of an ink deposition computation process.

FIG. 7 is a flow diagram illustrating one embodiment of a process 700 for generating ink deposition data. Process 700 may be performed by processing logic that may include hardware (e.g., circuitry, dedicated logic, programmable logic, microcode, etc.), software such as instructions run on a processing device, or a combination thereof. In one embodiment, process 700 is performed by ink deposition logic 240.

According to one embodiment, process 700 begins at processing block 710, where color ink model parameter data is received. As discussed above, the color ink model parameter data may be received from ink model estimation logic 220. At processing block 720, a PCS color is received. As mentioned above, the PCS color comprises a CIELAB color value.

At processing block 730, the PCS color is converted to a device color space color (e.g., CMYK) value. At processing block 740, each device color space component is converted to a separate PCS color value (L*_X, a*_X and b*_X). At processing block 750, ink deposition data is generated by applying the L*, a* and b* ink models to the L*_X, a*_X and b*_X values for each device color space component (X), and combining the values to generate the ID_C, ID_M, ID_Y and ID_K. Combining includes the step of resolving the proper ink deposition to use in the case of multiple values. At decision block 760, the ink deposition data is transmitted.

Referring to FIG. 2, difference estimation logic 250 receives ink deposition data and associated color data and determines color differences (Delta E) and/or ink deposition differences (Delta IDs) for a plurality of color values. In one embodiment, difference estimation logic 250 stores each color value and associated ink deposition data received from ink deposition logic 240 as color samples. In such an embodiment, an operator (or user) may select two or more color samples (e.g., via a graphical user interface (GUI) 260 at print controller 140) to perform a difference analysis.

Once selected, difference estimation logic 250 performs the difference analysis by comparing the color data and/or ink deposition data for each sample and generating Delta E and/or Delta IDs between the color samples. In one embodiment, the Delta Es and/or Delta IDs are displayed via GUI 260. However, in other embodiments, the Delta Es and/or Delta IDs are transmitted to another entity. By determining Delta Es and/or Delta IDs based on k deposition for the input color samples, the differences between the input color samples may be efficiently determined.

Figure 8:
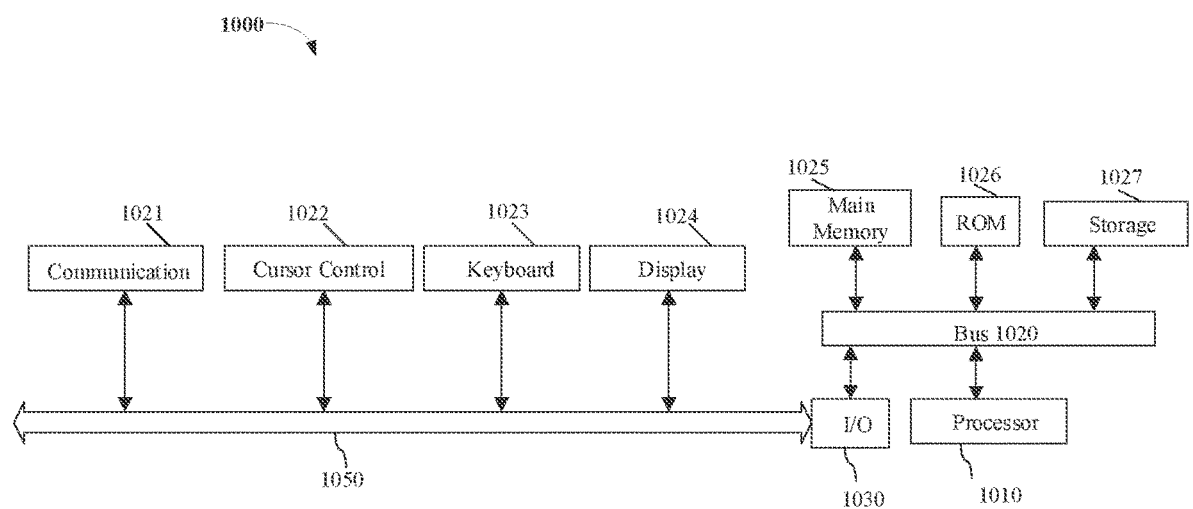
FIG. 8 illustrates one embodiment of a computer system.

FIG. 8 illustrates a computer system 1000 on which printing system 130, print controller 140, computing system 270 and/or computing system 275 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1027 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store ink model logic; and one or more processors coupled with the at least one physical memory device to execute the ink model logic to generate color space ink model parameter data for a print system based on an ink deposition data and color space measurement data for one of a plurality of inks for the print system.

Example 2 includes the subject matter of Example 1, wherein the color space ink model represents a relationship between values of a color space and ink deposition data for the one of a plurality of inks for the print system.

Example 3 includes the subject matter of Examples 1 and 2, wherein the ink deposition data represents a relationship between the ink deposition and a print system input control for one of a plurality of inks for the print system.

Example 4 includes the subject matter of Examples 1-3, wherein the color space measurement data represents a relationship between one of a plurality of color space parameters and the print system input control.

Example 5 includes the subject matter of Examples 1-4, wherein the ink deposition data comprises an amount of printed ink per print medium area.

Example 6 includes the subject matter of Examples 1-5, wherein the print system input control comprises a digital count.

Example 7 includes the subject matter of Examples 1-6, wherein the ink model estimation logic further generates a parametric equation for each of the plurality of color space parameters.

Example 8 includes the subject matter of Examples 1-7, wherein the color space ink model comprises Weibull cumulative distribution function (CDF) parameters.

Example 9 includes the subject matter of Examples 1-8, further comprising a controller.

Example 10 includes the subject matter of Examples 1-9, wherein the at least one physical memory device to store ink deposition logic and the one or more processors to execute the ink deposition logic to determine ink deposition data for an input color of the color space for the print system based on the color space ink model and an input color space value.

Some embodiments pertain to Example 11 that includes a method comprising generating color space ink model parameter data for a print system based on an ink deposition data and color space measurement data for one of a plurality of inks for the print system.

Example 12 includes the subject matter of Example 11, wherein the color space ink model represents a relationship between values of a color space and ink deposition data for the one of a plurality of inks for the print system.

Example 13 includes the subject matter of Examples 11 and 12, wherein the ink deposition data represents a relationship between the ink deposition and a print system input control for one of a plurality of inks for the print system.

Example 14 includes the subject matter of Examples 11-13, wherein the color space measurement data represents a relationship between one of a plurality of color space parameters and the print system input control.

Example 15 includes the subject matter of Examples 11-14, further comprising generating a parametric equation for each of the plurality of color space parameters.

Some embodiments pertain to Example 16 that includes at least one computer readable medium having instructions stored thereon, which when executed by one or more processors, cause the processors to generate color space ink model parameter data for a print system based on an ink deposition data and color space measurement data for one of a plurality of inks for the print system.

Example 17 includes the subject matter of Example 16, wherein the color space ink model represents a relationship between values of a color space and ink deposition data for the one of a plurality of inks for the print system.

Example 18 includes the subject matter of Examples 16 and 17, wherein the ink deposition data represents a relationship between the ink deposition and a print system input control for one of a plurality of inks for the print system.

Example 19 includes the subject matter of Examples 16-18, wherein the color space measurement data represents a relationship between one of a plurality of color space parameters and the print system input control.

Example 20 includes the subject matter of Examples 16-19, having instructions stored thereon, which when executed by one or more processors, further cause the processors to generate a parametric equation for each of the plurality of color space parameters.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store ink model estimation logic; and
   one or more processors coupled with the at least one physical memory device to execute the ink model estimation logic to generate color space ink model parameter data for a print system based on an ink deposition data and color space measurement data for one of a plurality of primary color inks for the print system, wherein the color space measurement data represents color response data for each of a plurality of parameters in a device independent color space and the color space ink model parameter data represents a relationship between each of the plurality of parameters of the device independent color space and ink deposition data for the one of the plurality of primary color inks for the print system.

2. The system of claim 1, wherein the ink deposition data represents a relationship between the ink deposition and a print system input control for one of a plurality of inks for the print system.

3. The system of claim 2, wherein the ink deposition data comprises an amount of printed ink per print medium area.

4. The system of claim 1, wherein the color space measurement data represents a relationship between each of the plurality of color space parameters and the print system input control.

5. The system of claim 4, wherein the print system input control comprises a digital count.

6. The system of claim 1, wherein the ink model estimation logic further generates a parametric equation for each of the plurality of color space parameters.

7. The system of claim 6, wherein the color space ink model comprises Weibull cumulative distribution function (CDF) parameters.

8. The system of claim 1, further comprising a controller.

9. The system of claim 1, wherein the at least one physical memory device to store ink deposition logic and the one or more processors coupled with the at least one physical memory device to execute the ink deposition logic to determine ink deposition data for an input color of the color space for the print system based on the color space ink model and an input color space value.

10. A method comprising generating color space ink model parameter data for a print system based on an ink deposition data and color space measurement data for one of a plurality of primary color inks for the print system, wherein the color space measurement data represents color response data for each of a plurality of parameters in a device independent color space and the color space ink model parameter data represents a relationship between each of the plurality of parameters of the device independent color space and ink deposition data for the one of the plurality of primary color inks for the print system.

11. The method of claim 10, wherein the ink deposition data represents a relationship between the ink deposition and a print system input control for one of a plurality of inks for the print system.

12. The method of claim 10, wherein the color space measurement data represents a relationship between each of the plurality of color space parameters and the print system input control.

13. The method of claim 10, further comprising generating a parametric equation for each of the plurality of color space parameters.

14. At least one non-transitory computer readable medium having instructions stored thereon, which when executed by one or more processors, cause the processors to generate color space ink model parameter data for a print system based on an ink deposition data and color space measurement data for one of a plurality of primary color inks for the print system, wherein the color space measurement data represents color response data for each of a plurality of parameters in a device independent color space and the color space ink model parameter data represents a relationship between each of the plurality of parameters of the device independent color space and ink deposition data for the one of the plurality of primary color inks for the print system.

15. The computer readable medium of claim 14, wherein the ink deposition data represents a relationship between the ink deposition and a print system input control for one of a plurality of inks for the print system.

16. The computer readable medium of claim 14, wherein the color space measurement data represents a relationship between each of the plurality of color space parameters and the print system input control.

17. The computer readable medium of claim 14, having instructions stored thereon, which when executed by one or more processors, further cause the processors to generate a parametric equation for each of the plurality of color space parameters.

* * * * *